US010955900B2

(12) United States Patent
Rao et al.

(10) Patent No.: US 10,955,900 B2
(45) Date of Patent: Mar. 23, 2021

(54) SPECULATION THROTTLING FOR RELIABILITY MANAGEMENT

(71) Applicant: International Business Machines Corporation, Armonk, NY (US)

(72) Inventors: Rahul Rao, Bangalore (IN); Preetham M. Lobo, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/208,621

(22) Filed: Dec. 4, 2018

(65) Prior Publication Data

US 2020/0174542 A1  Jun. 4, 2020

(51) Int. Cl.
  *G06F 1/32* (2019.01)
  *G06F 1/324* (2019.01)
  *G06F 9/38* (2018.01)
  *G06F 9/48* (2006.01)

(52) U.S. Cl.
  CPC ............ *G06F 1/324* (2013.01); *G06F 9/3804* (2013.01); *G06F 9/3842* (2013.01); *G06F 9/4893* (2013.01)

(58) Field of Classification Search
  CPC .................. G06F 1/32; G06F 9/44; G06F 1/28
  See application file for complete search history.

(56) References Cited

U.S. PATENT DOCUMENTS

| 6,826,704 | B1 | 11/2004 | Pickett | |
|---|---|---|---|---|
| 7,493,607 | B2 | 2/2009 | Moritz | |
| 8,650,428 | B2 | 2/2014 | Bajic et al. | |
| 9,836,304 | B2 | 12/2017 | Denman et al. | |
| 2003/0182542 | A1* | 9/2003 | Davies | G06F 9/3842 712/235 |
| 2007/0260897 | A1* | 11/2007 | Cochran | G06F 1/3203 713/300 |
| 2014/0068311 | A1* | 3/2014 | Jenne | G06F 1/3296 713/340 |
| 2015/0130821 | A1 | 5/2015 | Shah et al. | |
| 2015/0378915 | A1 | 12/2015 | Gschwind | |
| 2016/0062768 | A1 | 3/2016 | Jagannathan et al. | |
| 2017/0090936 | A1* | 3/2017 | Al Sheikh | G06F 9/3806 |
| 2017/0293332 | A1* | 10/2017 | Rotem | G06F 1/3212 |
| 2019/0025810 | A1* | 1/2019 | Chapin | G06Q 10/20 |

* cited by examiner

*Primary Examiner* — Keshab R Pandey
(74) *Attorney, Agent, or Firm* — Cantor Colburn LLP; Bryan Bortnick

(57) ABSTRACT

Examples of techniques for speculation throttling for reliability management are described herein. An aspect includes determining that a power state of a processor is above a speculation throttling threshold. Another aspect includes, based on determining that the power state of the processor is above the speculation throttling threshold, throttling speculation in the processor. Another aspect includes determining that the power state of the processor is above a power proxy threshold, wherein the power proxy threshold is higher than the speculation throttling threshold. Another aspect includes, based on determining that the power state of the processor is above the power proxy threshold, enabling a performance throttle unit of the processor.

17 Claims, 4 Drawing Sheets

SPECULATION THROTTLING FOR RELIABILITY MANAGEMENT

BACKGROUND

The present techniques relate to processors. More specifically, the techniques relate to speculation throttling for reliability management in processors.

Reliability events in a computer system may impact system reliability. In order to avoid damage to the computer system from a reliability event, operations of the processor may be throttled or stopped when a reliability event is detected. Reliability management is performed in response to a condition of impending reliability concern that may be flagged by on-chip or on-system sensors. Some examples of reliability management techniques include dynamic voltage and frequency scaling (DVFS), or performance throttling of all operations in the processor via issue rate management. In DVFS, the voltage and frequency of the processor are reduced. Voltage is the main determinant of power usage and heating in a processor. The voltage required for the stable operation of a processor is determined by the frequency at which the circuit is clocked; the voltage can be reduced if the frequency of the circuit is also reduced. DVFS reduces the number of instructions the processor can issue in a given amount of time, and may therefore result in a relatively large performance drop in the processor.

A performance throttling mechanism (PTM) is responsible for reducing system performance in order to mitigate impending reliability events, such as thermal reliability issues, likely_current draw>max_current_budget, voltage droop, etc. Whenever the PTM is triggered, the execution pipeline is throttled, reducing the power consumption and voltage drop. However, the performance drop from PTM or DVFS may be very large.

SUMMARY

According to an embodiment described herein, a system can include a processor to determine that a power state of a processor is above a speculation throttling threshold. The processor can also, based on determining that the power state of the processor is above the speculation throttling threshold, throttle speculation in the processor. The processor can also determine that the power state of the processor is above a power proxy threshold, wherein the power proxy threshold is higher than the speculation throttling threshold. The processor can also, based on determining that the power state of the processor is above the power proxy threshold, enabling a performance throttle unit of the processor.

According to another embodiment described herein, a method can include determining that a power state of a processor is above a speculation throttling threshold. The method can also include, based on determining that the powers state of the processor is above the speculation throttling threshold, throttling speculation in the processor. The method can also include determining that the power state of the processor is above a power proxy threshold, wherein the power proxy threshold is higher than the speculation throttling threshold. The method can also include, based on determining that the power state of the processor is above the power proxy threshold, enabling a performance throttle unit of the processor.

According to another embodiment described herein, an apparatus can include hardware logic to determine that a power state of a processor is above a speculation throttling threshold. The apparatus can also include hardware logic to, based on determining that the powers state of the processor is above the speculation throttling threshold, throttle speculation in the processor. The apparatus can also include hardware logic to determine that the power state of the processor is above a power proxy threshold, wherein the power proxy threshold is higher than the speculation throttling threshold. The apparatus can also include hardware logic to, based on determining that the power state of the processor is above the power proxy threshold, enable a performance throttle unit of the processor.

DETAILED DESCRIPTION

Figure 1:
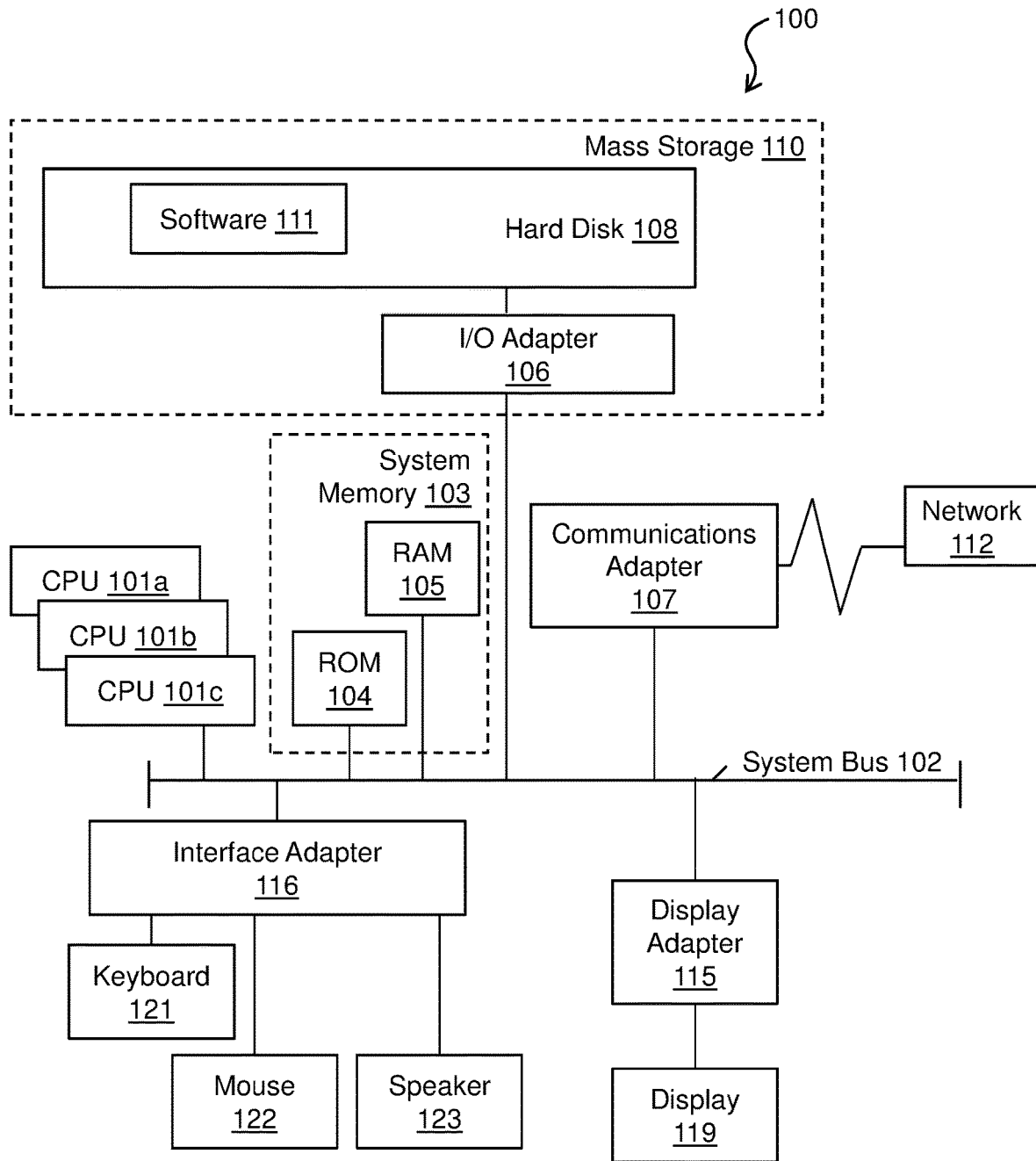
FIG. 1 is a block diagram of an example computer system for use with speculation throttling for reliability management.

Embodiments of speculation throttling for reliability management are provided, with exemplary embodiments being discussed below in detail. A processor may implement various types of speculation, such as branch prediction, speculative execution of instructions along a predicted path, instruction prefetching, data prefetching, and dataflow analysis for out-of-order execution. Speculation includes any operations that are executed based on a probability of certain instruction sequences being followed. Speculation may consume a relatively large amount of power in a computer processor. Therefore, speculation may be throttled, as opposed to throttling overall execution in the processor, as a first step towards power/reliability management when impending trouble due to a reliability event is marginal. In some embodiments, throttling of speculation may resolve the impending reliability event, so that more drastic measures are not required.

Speculative work is done before it is known whether it is actually needed, so as to prevent a delay that would have to be incurred by doing the work after it is known that it is needed. If it turns out the work was not needed at resolution, any changes made by the work may be reverted and the results are ignored. Speculation may provide additional concurrency in a processor, because, if extra resources are available, the extra resources may be used for speculation. Speculation may therefore improve CPU performance. Speculation may be throttled as a first step towards reliability management when impending trouble is at a relatively low level. In order to throttle speculation, an estimate of the time to an impending reliability event may be determined. A reliability event may be any of, for example, a thermal event, or a power event such as voltage droop. The time to the impending reliability event may be determined based on any appropriate sensors in the processor. An estimate of the amount of benefit that may be realized to the sensor output due to throttling of speculation may also be determined. The amount of benefit may be determined based on a power proxy table in some embodiments. In some embodiments, speculative metrics may be included in the power proxy table, along with associated capacitance for speculation, in order to allow determination of the estimated benefit.

A control for pausing or reducing the rate of speculation in the processor may also be provided. In some embodiments, one or more specific types of speculation may be targeted for throttling, based on the determined time to the reliability event and determined amount of benefit from throttling. One or more types of speculation may be throttled separately in various embodiments, including but not limited to instruction prefetching, data prefetching, branch prediction, speculative execution of instructions along a predicted path, scalar ops for the load/store unit, prediction, and dataflow analysis for out-of-order execution. In various embodiments, throttling of speculation may include one or more of: reducing the issue rate for threads under speculative execution; suspending or reducing branch prediction mode (e.g., only use a local branch history table (BHT) table, and not global BHT); and suspending prefetching.

Embodiments include multiple thresholds that are set in the processor that may be compared to, for example, a power state of the processor. A first, lower threshold (i.e., a speculation throttling threshold) may trigger throttling of speculation in the processor. A second, higher threshold (i.e., a power proxy threshold) may trigger instruction throttling or dynamic voltage frequency scaling (DVFS). Depending on the estimated time to impending trouble, a speculation throttling rate may be determined along with an associated benefit for the speculation throttling rate to the monitored sensor output. Power proxy events and speculation events from the processor may also be monitored. In some embodiments, throttling of speculation may initially be set to a high level, and then gradually ramped down to no throttling after the impending reliability event has been mitigated. In some embodiments, a digital thermal sensor (DTS) may be monitored for thermal management, and a critical path monitor (CPM) may be monitored for power management.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc. (collectively or generically referred to as processor(s) 101). The processors 101 can be a single-core processor, multi-core processor, computing cluster, or any number of other configurations. The processors 101, also referred to as processing circuits, may also include one or more accelerators (e.g., a graphics processing unit, or GPU) in some embodiments. The processors 101 are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
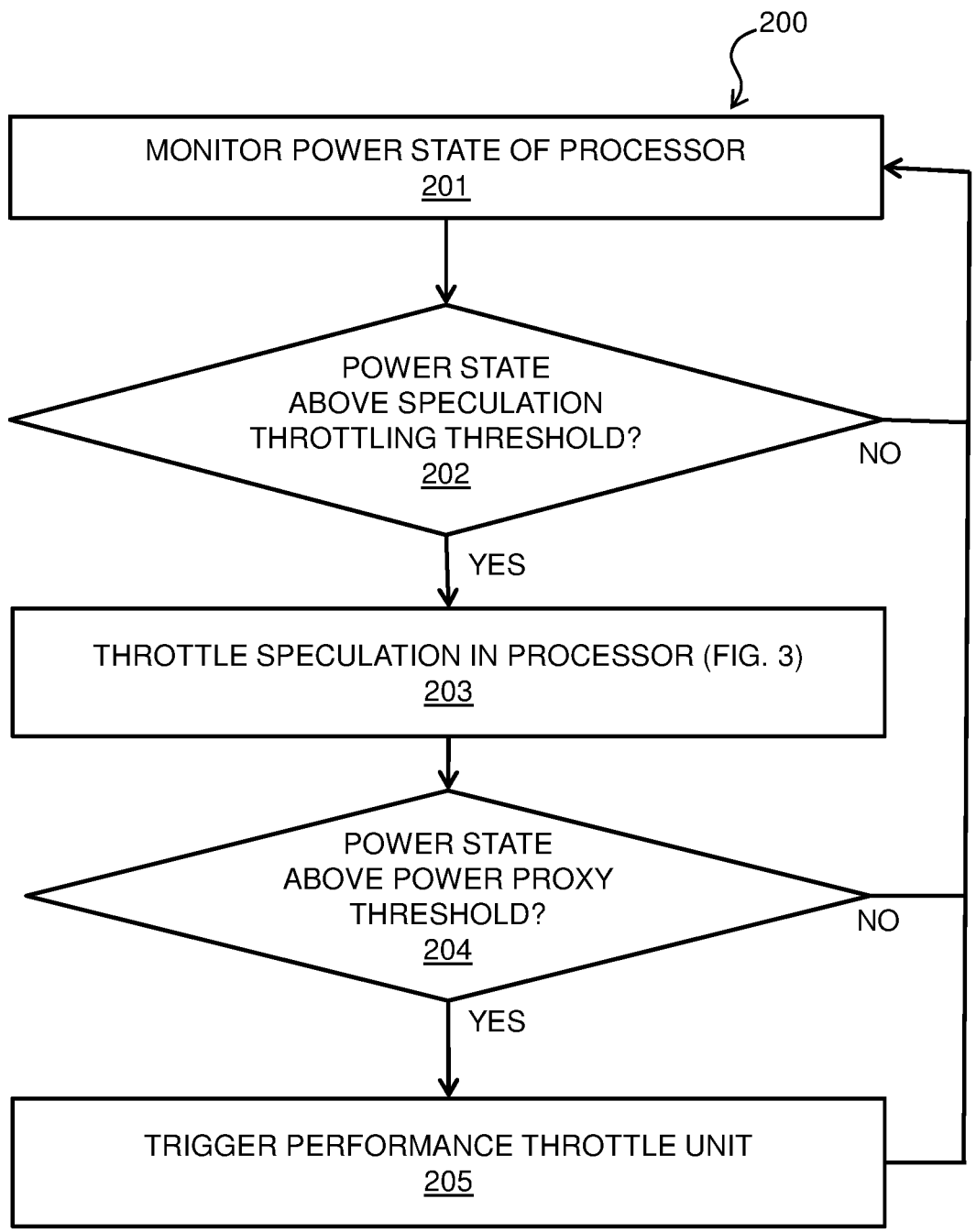
FIG. 2 is a process flow diagram of an example method for speculation throttling for reliability management.

FIG. 2 is a process flow diagram of an example method 200 for speculation throttling for reliability management. The method 200 can be implemented with any suitable computing device, such as the computer system 100 of FIG. 1. In block 201 of FIG. 2, the power state of a processor (such as any of processors 101 FIG. 1) is monitored. The monitoring may be performed based on various sensors (including but not limited to thermal or power sensors) that are located in the processor. In some embodiments, power proxy events and speculation events from the processor may be monitored to detect impending reliability events, which may include but are not limited to thermal events, and power events such as voltage droop. In block 202, it is determined whether the power state of the processor is above a speculation throttling threshold. This determination may be made based on any appropriate sensors in the processor in various embodiments. In some embodiments of block 202, it may be determined whether the power state of the processor is projected to exceed the speculation throttling threshold based on an upward trend in the sensor outputs that are being monitored. For example, in some embodiments, a rate of change of one or more sensor outputs may be monitored, and a projection of future values of the one or more sensor outputs over a next N cycles may be made. If a sensor output is projected to be over the speculation throttling threshold within the next N cycles, an impending reliability event that calls for speculation throttling may be indicated. If it is determined in block 202 that the power state of the processor is not above the speculation throttling threshold, flow returns to block 201 from block 202, and the monitoring continues.

If it is determined in block 202 that the power state of the processor is above the speculation throttling threshold, flow proceeds from block 202 to block 203. In block 203, speculation in the processor is throttled. Block 203 is discussed in further detail below with respect to FIG. 3. Then, in block 204, it is determined whether the power state of the processor is above the power proxy threshold. The power proxy threshold is higher than the speculation throttling threshold. If it is determined in block 204 that the power state of the processor is not above the power proxy threshold, flow returns to block 201 from block 204, and the monitoring of the power state of the processor continues. If it is determined in block 204 that the power state of the processor is above the power proxy threshold, flow proceeds to block 205, and the performance throttle unit of the processor is triggered. The performance throttle unit may throttle execution of all instructions in the processor until the power state of the processor drops back below the power proxy threshold. Method 200 of FIG. 2 may be repeatedly performed while the processor is in operation.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
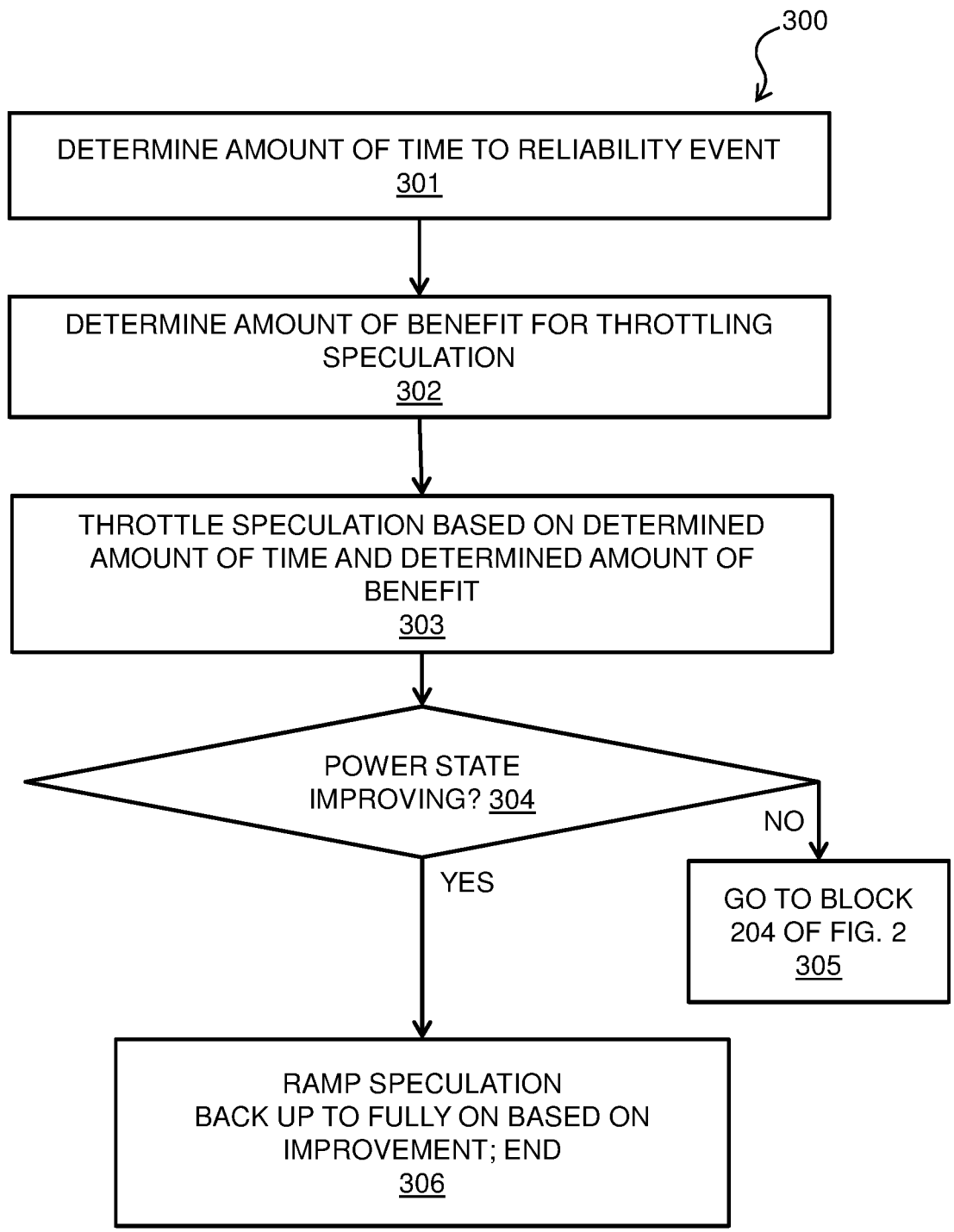
FIG. 3 is a process flow diagram of another example method for speculation throttling for reliability management.

FIG. 3 is a process flow diagram of an example method 300 for speculation throttling for reliability management. The method 200 can be implemented with any suitable computing device, such as the computer system 100 of FIG. 1. Method 300 may be performed in block 203 of method 200 of FIG. 2, and be triggered when the power state of the processor (for example, any of processors 101 of FIG. 1) is above the speculation throttling threshold, as determined in block 202 of FIG. 2. In block 301, an amount of time to a reliability event is determined based on an upward trend in the one or more sensor outputs that are being monitored in the processor. Then, in block 302, an amount of benefit to the power state of the processor from throttling speculation is determined. The amount of benefit may be determined based on a power proxy table of the processor in some embodiments. In some embodiments, speculative metrics may be included in the power proxy table, along with associated capacitance for speculation, in order to allow determination of the estimated benefit in block 302. In some embodiments, different amounts of benefit may be determined for throttling of different types of speculation in block 302, and a type of speculation to be throttled may be selected based on the type for which there is the largest amount of benefit. Types of throttling for which an amount of benefit may be determined in block 302 include, but are not limited to, instruction prefetching, data prefetching, branch prediction, speculative execution of instructions along a predicted path, scalar ops for the load/store unit, prediction, and dataflow analysis for out-of-order execution. In some embodiments of block 302, the amount of benefit may also be determined for various degrees of throttling for each type of speculation, e.g., reducing the rate of a type of speculation versus turning the type of speculation off.

Next, in block 303, speculation is throttled based on the determinations of block 301 and 302. The type(s) and degree(s) of throttling may be selected in block 303 in order to mitigate the impending reliability event that was detected in block 202 of FIG. 2. For example, throttling of speculation in block 303 may include one or more of: reducing the issue rate for threads under speculative execution; suspending or reducing branch prediction mode (e.g., only use a local BHT, and not global BHT); and suspending prefetching, and reducing the amount of prefetching. One or more types of speculation may be throttled or turned off via, for example, one or more disable bits in the speculation logic of the processor. In some embodiments, each speculative process that is handled by the speculation logic can be controlled independently, and one or more types of speculative processes giving the largest benefit in terms of mitigating the reliability event may be throttled. Further examples of speculation throttling may be to only use a subset of branch predictors for prediction instead of the entire set, or prefetching only one additional line from the next level of cache, as opposed to 4 lines.

In block 304, it is determined whether the speculation throttling that was performed in block 303 is improving the power state of the processor. This is determined based on monitoring the one or more sensor outputs. If it is determined in block 304 that the power state of the processor is not improving, flow proceeds to block 305, which returns to block 204 of method 200 of FIG. 2. In block 204 of FIG. 2, it is determined whether more extreme throttling measures are required to mitigate an impending reliability event based on the comparison of the one or more sensor outputs to the power proxy threshold, and method 300 ends. If it is determined in block 304 that the power state of the processor is sufficiently improved, flow proceeds from block 304 to block 306, in which speculation throttling is stopped. Speculation is ramped back up to full on based on the improvement in block 306, and method 300 ends.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
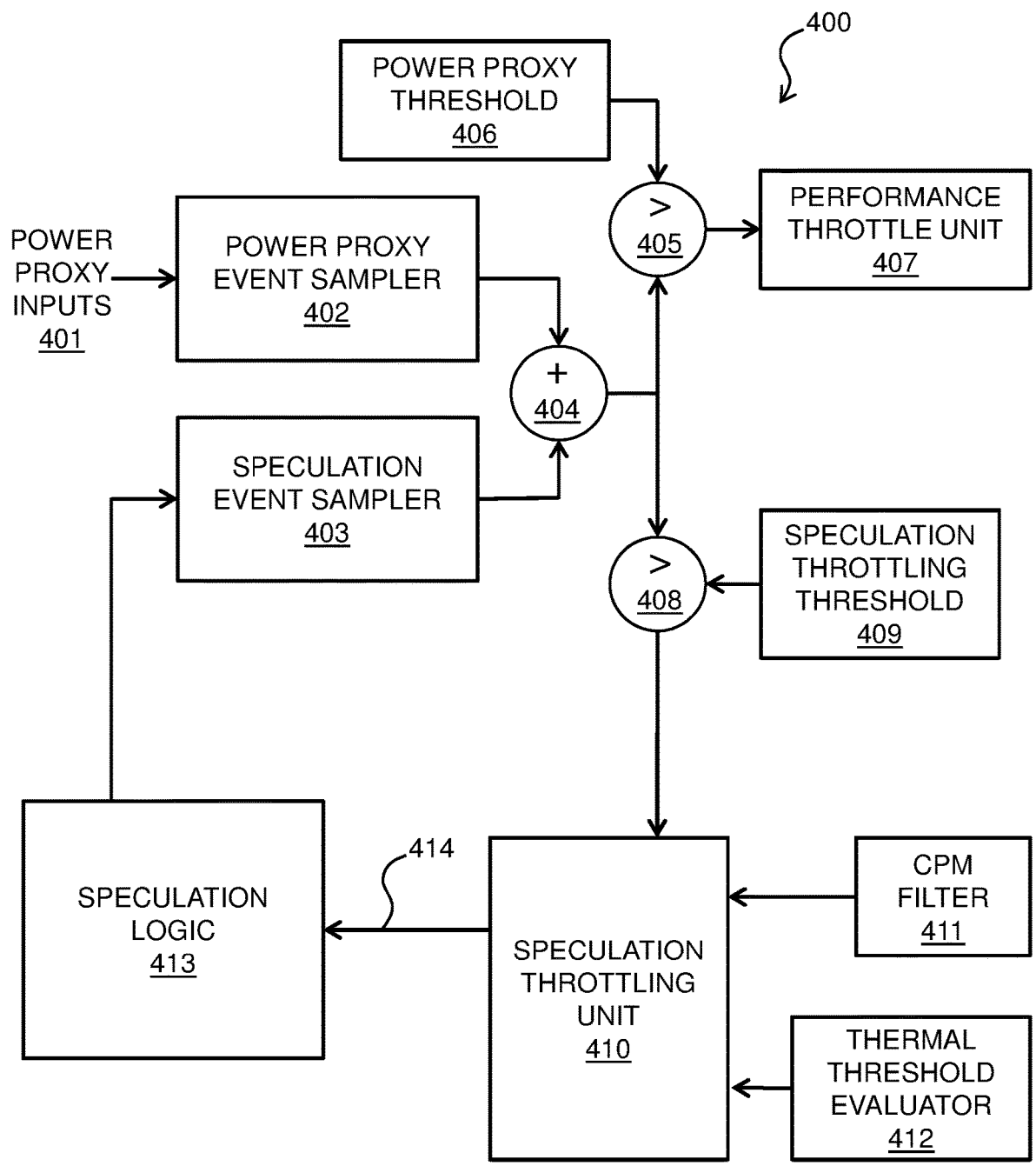
FIG. 4 is a block diagram of an example computing system for speculation throttling for reliability management.

FIG. 4 illustrates an embodiment of an example system 400 for speculation throttling for reliability management. System 400 may be implemented in any appropriate processing circuit, such as any of processors 101 of FIG. 1. System 400 may implement embodiments of method 200 of FIG. 2 and method 300 of FIG. 3. Power proxy inputs 401 provide sensor data (e.g., temperature sensor data) to a power proxy event sampler 402. The power proxy event sampler 402 samples the state of the processor based on the sensor data that is provided by the power proxy inputs 401. Speculation event sampler 403 receives data regarding speculation in the processor from speculation logic 413. The outputs of power proxy event sampler 402 and speculation event sampler 403 are provided to an adder 404. The adder 404 provides an output that quantifies a power state of the processor, and provides the power state of the processor to comparators 405 and 408. Comparator 405 compares the power state of the processor from adder 404 to the power proxy threshold 406 (as described above with respect to block 204 of FIG. 2). If the comparator 405 determines that the current power state of the processor is higher than the power proxy threshold 406, the comparator 405 provides an enable signal to performance throttle unit 407. The performance throttle unit 407 may throttle all execution in the processor in order to mitigate a reliability event. Enabling of the performance throttle unit 407 may override enabling of the speculation throttling unit 410.

Comparator 408 compares the power state of the processor from adder 404 to the speculation throttling threshold 409, as described above with respect to block 202 of FIG. 2. The power proxy threshold 406 is higher than the speculation throttling threshold 409. If the comparator 408 determines that the current power state of the processor is higher than the speculation throttling threshold 409, the comparator 408 provides an enable signal to speculation throttling unit 410. The speculation throttling unit 410 may receive an input from the CPM filter 411. The CPM filter 411 may filter incoming CPM values every cycle, and check if the value has reached an emergency threshold, indicating voltage droop. The speculation throttling unit 410 may also receive an input from a thermal threshold evaluator 412, which checks the DTS values at periodic intervals against a threshold. The speculation throttling unit 410 may use the data from the CPM filter 411 and the thermal threshold evaluator 412 to determine the amount of time to the impending event as described above with respect to block 301 of FIG. 3 and to determine the amount of benefit for various types and degrees of speculation throttling as described with respect to block 302 of FIG. 3. The speculation throttling unit 410 sends a throttling signal 414 to the speculation logic 413.

Embodiments of the speculation logic 413 may include any appropriate speculation logic, including but not limited to instruction prefetching, data prefetching, branch prediction, speculative execution of instructions along a predicted path, scalar ops for the load/store unit, prediction, and dataflow analysis for out-of-order execution. In various embodiments, one or more of the types of speculation may be reduced or turned off, depending on the throttling signal 414 from the speculation throttling unit 410. In some embodiments, one or more specific types of speculation may be targeted for throttling by the throttling signal 414, based on the determined magnitude of the reliability event and determine the amount of benefit from throttling. Any type of speculation included in speculation logic 413 may be throttled or turned off in various embodiments. For example, throttling of speculation in speculation logic 413 may include one or more of: reducing the issue rate for threads under speculative execution; suspending or reducing branch prediction mode (e.g., only use a local BHT, and not global BHT); and suspending prefetching.

As speculation is throttled in the speculation logic 413, the speculation event sampler 403 will be provided with data regarding the speculation throttling, and this data will be taken into account in determining the power state of the processor that is output by adder 404. When the power state of the processor has dropped sufficiently, the comparator 408 may determine that the power state is lower than the speculation throttling threshold 409, and the comparator 408 may send a disable signal to the speculation throttling unit 410.

It is to be understood that the block diagram of FIG. 4 is not intended to indicate that the system 400 is to include all of the components shown in FIG. 4. Rather, the system 400 can include any appropriate fewer or additional components not illustrated in FIG. 4 (e.g., additional logic, memory components, embedded controllers, modules, etc.). Further, the embodiments described herein with respect to system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
  determine that a power state of the processor is above a speculation throttling threshold;
  based on determining that the power state of the processor is above the speculation throttling threshold, throttle speculation in the processor, wherein throttling speculation in the processor comprises:
    determining an amount of time to a reliability event in the processor based on the power state of the processor;
    determining an amount of benefit to the power state of the processor from throttling speculation;
    determining a type and degree of speculation throttling based on the amount of time and amount of benefit; and
    throttling speculation in the processor based on the determined type and degree;
  determine that the power state of the processor is above a power proxy threshold, wherein the power proxy threshold is higher than the speculation throttling threshold; and
  based on determining that the power state of the processor is above the power proxy threshold, enable a performance throttle unit of the processor.

2. The system of claim 1, wherein determining that the power state of the processor is above the speculation throttling threshold comprises:
  determining an upward trend in the power state of the processor; and
  determining, based on the upward trend, that the power state of the processor will be above the speculation throttling threshold within a predetermined number of cycles.

3. The system of claim 1, wherein determining the amount of benefit from throttling speculation comprises determining a respective amount of benefit for each of a plurality of types of speculation.

4. The system of claim 3, wherein the plurality of types of speculation comprise: instruction prefetching, data prefetching, branch prediction, speculative execution of instructions along a predicted path, scalar ops for a load/store unit, prediction, and dataflow analysis for out-of-order execution.

5. The system of claim 3, wherein the degree of throttling applied to a first type of speculation is different from a degree of throttling applied to a second type of speculation.

6. The system of claim 1, the processor configured to:
  determine that the power state of the processor is below the speculation throttling threshold; and
  based on determining that the power state of the processor is below the speculation throttling threshold, stop throttling of speculation in the processor.

7. A computer-implemented method, comprising:
  determining that a power state of a processor is above a speculation throttling threshold;
  based on determining that the power state of the processor is above the speculation throttling threshold, throttling speculation in the processor, wherein throttling speculation in the processor comprises:
    determining an amount of time to a reliability event in the processor based on the power state of the processor;
    determining an amount of benefit to the power state of the processor from throttling speculation;
    determining a type and degree of speculation throttling based on the amount of time and amount of benefit; and
    throttling speculation in the processor based on the determined type and degree;
  determining that the power state of the processor is above a power proxy threshold, wherein the power proxy threshold is higher than the speculation throttling threshold; and
  based on determining that the power state of the processor is above the power proxy threshold, enabling a performance throttle unit of the processor.

8. The computer-implemented method of claim 7, wherein determining that the power state of the processor is above the speculation throttling threshold comprises:
  determining an upward trend in the power state of the processor; and
  determining, based on the upward trend, that the power state of the processor will be above the speculation throttling threshold within a predetermined number of cycles.

9. The computer-implemented method of claim 7, wherein determining the amount of benefit from throttling speculation comprises determining a respective amount of benefit for each of a plurality of types of speculation.

10. The computer-implemented method of claim 9, wherein the plurality of types of speculation comprise: instruction prefetching, data prefetching, branch prediction, speculative execution of instructions along a predicted path, scalar ops for a load/store unit, prediction, and dataflow analysis for out-of-order execution.

11. The computer-implemented method of claim 9, wherein the degree of throttling applied to a first type of speculation is different from a degree of throttling applied to a second type of speculation.

12. The computer-implemented method of claim 7, the method comprising:
  determining that the power state of the processor is below the speculation throttling threshold; and
  based on determining that the power state of the processor is below the speculation throttling threshold, stopping throttling of speculation in the processor.

13. An apparatus, comprising hardware logic configured to:
  determine that a power state of a processor is above a speculation throttling threshold;
  based on determining that the power state of the processor is above the speculation throttling threshold, throttle speculation in the processor, wherein throttling speculation in the processor comprises:
    determining an amount of time to a reliability event in the processor based on the power state of the processor;
    determining an amount of benefit to the power state of the processor from throttling speculation;
    determining a type and degree of speculation throttling based on the amount of time and amount of benefit; and
    throttling speculation in the processor based on the determined type and degree;

determine that the power state of the processor is above a power proxy threshold, wherein the power proxy threshold is higher than the speculation throttling threshold; and based on determining that the power state of the processor is above the power proxy threshold, enable a performance throttle unit of the processor.

14. The apparatus of claim 13, wherein determining that the power state of the processor is above the speculation throttling threshold comprises:

determining an upward trend in the power state of the processor; and determining, based on the upward trend, that the power state of the processor will be above the speculation throttling threshold within a predetermined number of cycles.

15. The apparatus of claim 13, wherein determining the amount of benefit from throttling speculation comprises determining a respective amount of benefit for each of a plurality of types of speculation.

16. The apparatus of claim 15, wherein the plurality of types of speculation comprise: instruction prefetching, data prefetching, branch prediction, speculative execution of instructions along a predicted path, scalar ops for a load/store unit, prediction, and dataflow analysis for out-of-order execution.

17. The apparatus of claim 15, wherein the degree of throttling applied to a first type of speculation is different from a degree of throttling applied to a second type of speculation.

* * * * *